United States Patent [19]
Inoue

[11] Patent Number: 5,524,069
[45] Date of Patent: Jun. 4, 1996

[54] METHOD OF EXTRACTING A CHARACTERISTIC FIGURE FROM A COLOR PICTURE AND AN APPARATUS USED THEREFOR

[75] Inventor: Akira Inoue, Tokyo, Japan

[73] Assignee: NEC Corporation, Tokyo, Japan

[21] Appl. No.: 351,142

[22] Filed: Nov. 30, 1994

Related U.S. Application Data

[63] Continuation of Ser. No. 4,059, Jan. 13, 1993, abandoned.

[30] Foreign Application Priority Data

Jan. 13, 1992 [JP] Japan ................................. 4-003435

[51] Int. Cl.$^6$ ......................................... G06K 9/38
[52] U.S. Cl. ............................................. 382/270
[58] Field of Search ................................. 382/128, 130, 382/254, 270, 273, 282; 358/500, 540

[56] References Cited

U.S. PATENT DOCUMENTS

| | | | |
|---|---|---|---|
| 4,317,179 | 2/1982 | Kato et al. | 382/6 |
| 4,355,427 | 6/1982 | Hunt et al. | 382/6 |
| 4,437,161 | 3/1984 | Anderson | 382/6 |
| 4,577,218 | 3/1986 | Kurata | 358/500 |
| 4,809,349 | 2/1989 | Herby et al. | 382/50 |
| 5,034,806 | 7/1991 | Ikeda et al. | 358/540 |
| 5,042,077 | 8/1991 | Burke | 382/6 |
| 5,202,935 | 4/1993 | Kanamori et al. | 382/54 |

OTHER PUBLICATIONS

"Computer Graphics: Principles & Practice" 2d ed, Foley et al, Addison–Wesley, 1991, pp. 563–564, 574–575.
"Digital Image Processing" Gonzoles & Woods, 1992 Addison–Wesley pp. 185, 196–197.

Primary Examiner—Joseph Mancuso
Assistant Examiner—Gerard Del Rosso
Attorney, Agent, or Firm—Sughrue, Mion, Zinn, Macpeak & Seas

[57] ABSTRACT

An original density picture is produced from an input color picture, a pixel in a background area is designated and the density of the designated pixel is used as a reference density. A background density picture is produced by processing the original density picture with the reference density. Or a background density picture is produced by filtering the original density picture through low pass filter means. By subtracting the background density picture from the original density picture, a characteristic figure superimposed on a background scenery is extracted.

13 Claims, 5 Drawing Sheets

METHOD OF EXTRACTING A CHARACTERISTIC FIGURE FROM A COLOR PICTURE AND AN APPARATUS USED THEREFOR

This is a continuation of application Ser. No. 08/004,059, filed Jan. 13, 1993, now abandoned.

BACKGROUND OF THE INVENTION

This invention relates to an application of image processing and pattern recognition, and more particularly to a method of extracting a characteristic figure from a color picture, where the characteristic figure is superimposed on a background which has a different color from that of the characteristic figure.

For extracting a characteristic figure from a color picture when the characteristic figure is superimposed on a background which has a different color from that of the characteristic figure, for example, for extracting a fingerprint or an image of a stamp printed on a color print, there is a conventional simple method of processing by a threshold level. A pixel in a color picture is usually represented by intensities of the three color components, that is R (red), G (green), B (blue) components. These values of a pixel are converted to an attribute of the pixel, for example, lightness or saturation, and all the pixels in the picture are classified into groups in accordance with the level of the attribute. For example, a pixel having an attribute level larger than a threshold level $\theta$ is classified as belonging to a group A, and a pixel having an attribute level not larger than the threshold level is classified as belonging to group B.

A group of pixels having the same attribute level in an area make up a characteristic figure.

Further, a background density reduction process is another method applicable when the background picture in the corresponding area is known. In this process, each pixel value of an input picture is converted to a density (scaler darkness of the pixel) and each pixel value of the background picture in the corresponding area is also converted to a density. At each pixel, the density level of the background picture is subtracted from that of the color picture for extracting the characteristic figure.

When a characteristic figure of a single color is superimposed on a background picture composed of plural areas having different colors, the resultant color of the characteristic figure becomes different on each different area of the plural areas, resulting in non-uniform attribute values of pixels in the characteristic figure. As such, the method of processing by a threshold level cannot be advantageously applied.

Although the background density reduction process has a high precision in extraction, it is unusual that the background picture is known, and the chance for applying this process is rather small.

BRIEF DESCRIPTION OF THE INVENTION

Therefore, a primary object of the present invention is to provide a method of extracting a characteristic figure from a color picture and an apparatus used therefor having an excellent extraction property when an attribute of the pixels on the characteristic figure is not uniform or when the background picture is unknown.

A first embodiment of this invention comprises a step of converting three color intensity values R, G, B of each pixel in an input color picture to corresponding three color density values $D_r$, $D_g$, $D_b$ for producing an original density picture, a step of designating an arbitrary pixel in a background area of the input color picture and determining a reference density by three color density values of the designated pixel, a step of processing the original density picture by a process A (the process A will be explained in a later paragraph) with the reference density for producing a background density picture, and a step of subtracting the background density picture from the original density picture to extract the characteristic figure. Three color intensity values R, G, B of a pixel can be represented by a vector in a three dimensional field, and this vector can be considered as an attribute of the pixel. This attribute of the pixel is converted to another attribute of the pixel. As densities of these three color components are defined by equations, $D_r = -\log R$, $D_g = -\log G$, $D_b = -\log B$, a vector represented by $$\begin{bmatrix} D_r \\ D_g \\ D_b \end{bmatrix}$$

is another attribute of the pixel.

In an operation of the present invention, a pixel is represented by three color density values of the pixel, and a picture in which each pixel is represented by three color density values will be called a density picture.

A second embodiment of this invention comprises all the steps of the first embodiment for extracting the characteristic figure in a background area of a color, and steps of repeating all the similar steps of the first embodiment for extracting the characteristic figure from the total input picture having plural background areas with different colors.

A third embodiment of this invention comprises a step of converting three color intensity values R, G, B of each pixel in an input color picture to corresponding three color density values $D_r$, $D_g$, $D_b$ for producing an original density picture, a step of producing a filtered density picture by low pass filter means, a step of processing the filtered density picture by a process B (the process B will be explained in a later paragraph) with a reference to the original density picture for producing a processed density picture, and a step of subtracting the processed density picture from the original density picture for extracting the characteristic figure. In producing a filtered density picture, three color density values $D_r$, $D_g$, $D_b$ of a pixel are substituted by corresponding average values $D_{ra}$, $D_{ga}$, $D_{ba}$ of neighboring pixels situated in a predetermined range from the object pixel.

A fourth embodiment of this invention comprises conversion means for producing the original density picture from the input color picture, designation means for designating a pixel in a background area and determining the density of the designated pixel as a reference density, calculation means for producing a background density picture from the original density picture through a process A with the reference density, subtraction means for producing a characteristic density picture by subtracting the background density picture from the original density picture, and reverse conversion means for producing a color picture of the characteristic figure from the characteristic density picture.

In the reverse conversion, three color density values $D_r$, $D_g$, $D_b$ are converted to three color intensity values R, G, B by equations $R = 10 \operatorname{Exp}(-D_r)$, $G = 10 \operatorname{Exp}(-D_g)$, $B = 10 \operatorname{Exp}(-D_b)$.

A fifth embodiment of this invention comprises extraction means including the conversion means, the designating means, the calculation means, the subtraction means, the reverse conversion means for extracting the characteristic figure from a background area of a color, interactive input means for deciding on a repetition of the extraction, and input control means for selecting an input color picture in accordance with the object of the decided repetition.

A sixth embodiment of this invention comprises conversion means for producing an original density picture from an input color picture, low pass filter means for producing a filtered density picture, calculation means for producing a processed density picture from the filtered density picture through a process B with the original density picture as the reference density, and subtraction means for producing a characteristic density picture by subtracting the processed density picture from the original density picture.

And in a seventh embodiment of this invention, means for emphasizing the contrast is further provided in the fourth, the fifth, and the sixth embodiments.

BRIEF DESCRIPTION OF THE DRAWINGS

Further objects, features, and advantages of this invention will become apparent from a consideration of the following description, the appended claims, and the accompanying drawings in which the same numerals indicate the same parts.

DETAILED DESCRIPTION OF THE PREFERRED EMBODIMENTS

Figure 4:
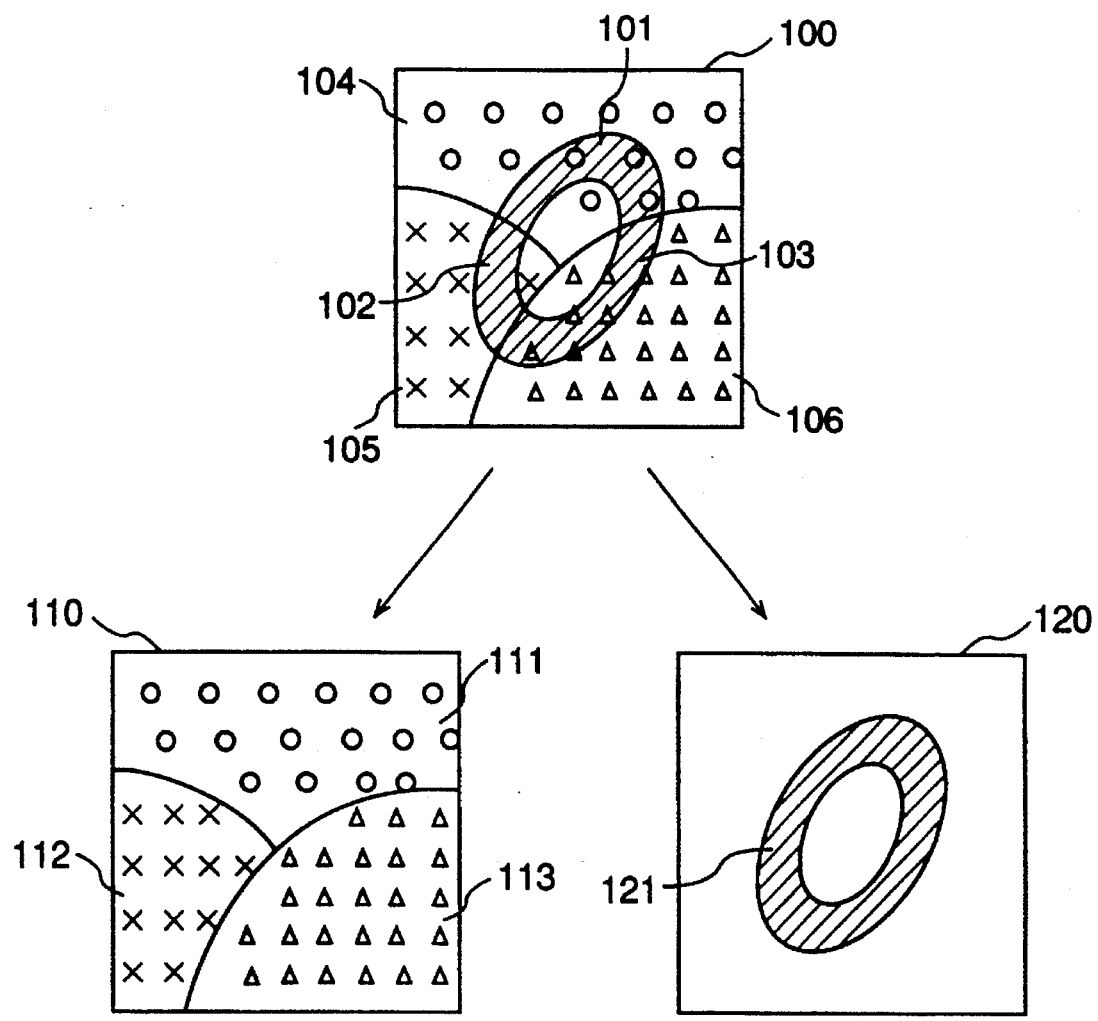
FIG. 4 shows an example of an input color picture.

An example of the input color picture 100 is shown in FIG. 4. The color picture 100 is composed of a background scenery 110 and a specified characteristic figure 120 which is superimposed on the background scenery 110.

The background scenery 110 is composed of a first background area 111 of a first color, a second background area 112 of a second color, and a third background area 113 of a third color. The characteristic figure 120 has a characteristic area 121 of a fourth color.

In a first section 101 of the characteristic figure 120, the first color and the fourth color are mixed in a subtractive color mixing, in a second section 102 of the characteristic figure 120, the second color and the fourth color are mixed in a subtractive color mixing, and in a third section 103 of the characteristic figure 120, the third color and the fourth color are mixed in a subtractive color mixing. In a subtractive color mixing, three color intensity values are decreased by mixing, and three color density values are added by mixing. A superimposed color printing is an example of a subtractive color mixing.

A part in the first background area 111 where the characteristic figure 120 is not superimposed is denoted by a numeral 104, a part in the second background area 112 where the characteristic figure 120 is not superimposed is denoted by a numeral 105, and a part in the third background area 113 where the characteristic figure 120 is not superimposed is denoted by a numeral 106.

In this invention, the picture 100 is converted to an original density picture in a first step. In the input color picture 100, a pixel is represented by three color intensity values R, G, B. Three color density values of the pixel ($D_r$, $D_g$, $D_b$) are given by equation (1).

$$\begin{bmatrix} D_r \\ D_g \\ D_b \end{bmatrix} = -\log \begin{bmatrix} R \\ G \\ B \end{bmatrix} \quad (1)$$

And in this equation the R, G, B values are normalized as ($0 \leq R, G, B \leq 1$). In the original density picture, each pixel is denoted by its three color density values calculated by equation (1).

Since all pixels in the area 104 have a similar color, three color density values of an arbitrary pixel in the area 104 can represent three color density values of all the pixels in the area 104. And thus, a pixel at a position ($x_0$, $y_0$) in the background area 104 is designated. Three color density values of the pixel at the position ($x_0$, $y_0$) have already been calculated in the process of producing the original density picture, and this density $$\vec{D}_0 = \begin{bmatrix} D_{r0} \\ D_{g0} \\ D_{b0} \end{bmatrix}$$

is used as the reference density in the process A mentioned above.

Now the process A is explained. Three color density values of some given pixel in the original density picture are $$\begin{bmatrix} D_r \\ D_g \\ D_b \end{bmatrix}.$$

Then, according to the subtraction of equation (2);

$$\begin{bmatrix} D_{r'} \\ D_{g'} \\ D_{b'} \end{bmatrix} = \begin{bmatrix} D_r \\ D_g \\ D_b \end{bmatrix} - a \begin{bmatrix} D_{r0} \\ D_{g0} \\ D_{b0} \end{bmatrix} \quad (2)$$

Under a restriction where $D_{r'} \geq 0$, $D_{g'} \geq 0$, and $D_{b'} \geq 0$, a maximum value $a_{max}$ of a coefficient 'a' is determined for each pixel. When all the $a_{max}$ values for all the pixels are determined, a common coefficient $k_1$ ($0 < k_1 \leq 1$) is multiplied to these $a_{max}$ values. The common coefficient $k_1$ is a weighting coefficient for influencing the density level of the background. Its use will be explained more fully below. And $a_{max} \times k_1 \times \vec{D}_0$ gives three color density values of the pixel in the background density picture.

The effect of the process A is described for a case where $k_1=1$. A pixel at position ($x_1$, $y_1$) in the area 104 is assumed to have the first color with density $\vec{D}_0$. The equation (2) for this pixel is $$\begin{bmatrix} D_{r'} \\ D_{g'} \\ D_{b'} \end{bmatrix} = \begin{bmatrix} D_{r0} \\ D_{g0} \\ D_{b0} \end{bmatrix} - a \begin{bmatrix} D_{r0} \\ D_{g0} \\ D_{b0} \end{bmatrix} \quad (2\text{-}1)$$

It is apparent that the maximum value of 'a', i.e., $a_{max}$ in the equation (2-1) is 1 (one), and the value $$\vec{D}_0 = \begin{bmatrix} D_{r0} \\ D_{g0} \\ D_{b0} \end{bmatrix}$$

is stored at the position $(x_1, y_1)$ in the background density picture. Another pixel at position $(x_2, y_2)$ in the area 104 is assumed to have the first color with density $n\vec{D}_0$. The equation (2) for this pixel is $$\begin{bmatrix} D_{r'} \\ D_{g'} \\ D_{b'} \end{bmatrix} = \begin{bmatrix} nD_{r0} \\ nD_{g0} \\ nD_{b0} \end{bmatrix} - a \begin{bmatrix} D_{r0} \\ D_{g0} \\ D_{b0} \end{bmatrix} \qquad (2\text{-}2)$$

Since $a_{max}$ in the equation (2-2) is n, the value $n\vec{D}_0$ is stored at the position $(x_2, y_2)$ in the background density picture.

Suppose a pixel at position $(x_3, y_3)$ in the first section 101 has a density $$\begin{bmatrix} D_r \\ D_g \\ D_b \end{bmatrix} = \begin{bmatrix} 1D_{r0} \\ mD_{g0} \\ nD_{b0} \end{bmatrix}$$

in equation (2), where $0 \leq 1 \leq m \leq n$. In this case, the maximum value of 'a' in the equation (2) is 1, and $$\vec{D}_0 = \begin{bmatrix} 1D_{r0} \\ 1D_{g0} \\ 1D_{b0} \end{bmatrix}$$

is stored at the position $(x_3, y_3)$ in the background density picture.

After this process A is performed, three color density values in the background density picture are subtracted from those in the original density picture. In this subtraction process, resultant three color density values of the pixels at positions $(x_0, y_0)$, $(x_1, y_1)$, $(x_2, y_2)$ in the area 104 become $$\begin{bmatrix} 0 \\ 0 \\ 0 \end{bmatrix},$$

and that of the pixel at position $(x_3, y_3)$ becomes a finite value represented by $$\begin{bmatrix} 0 \\ (m-1)D_{g0} \\ (n-1)D_{b0} \end{bmatrix}.$$

Thus the section 101 is extracted on a white background area 104.

In some cases, it is desirable that the density level in the background scenery is at a certain level which is not zero. In these cases, the value of the common coefficient $k_1$ is set at an appropriate value for the purpose. When $0 < k_1 < 1$, resultant three color density values of a pixel in the background area will be $$\begin{bmatrix} (1-k_1)D_{r0} \\ (1-k_1)D_{g0} \\ (1-k_1)D_{b0} \end{bmatrix}.$$

In the first embodiment of this invention as described in connection with FIG. 4, the section 101 is extracted from the background area 104. When the areas 105 and 106 have the same color as the area 104, or at least the same hue as that of the area 104, the total characteristic area 121 is extracted by this embodiment.

Figure 5:
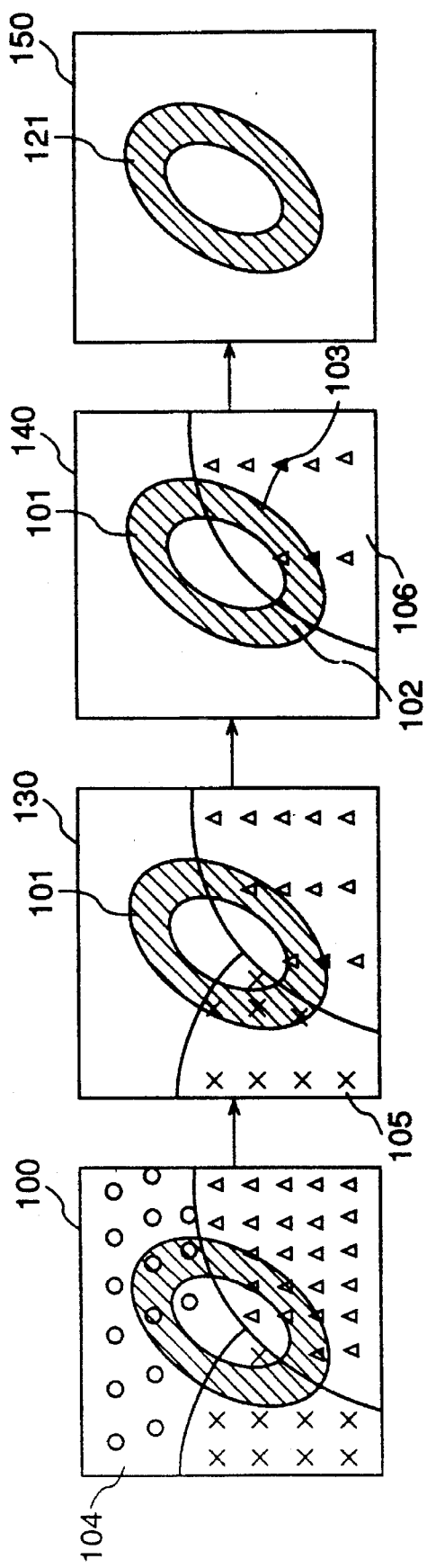
FIG. 5 shows an example of a color picture processed by the method of this invention.

But in general this is not the case. Referring to FIG. 5, the first section 101 is extracted from the color picture 100, leaving an unfinished color picture 130. When an unfinished color picture is obtained, the process preferably goes to a subsequent step described in a second embodiment.

In the next step, a pixel at position $(x_4, y_4)$ in the area 105 of the color picture 130 is selected. Three color density values of this pixel have already been calculated by means of the first embodiment. These three color density values are used as reference three color density values and the processes in the first embodiment is repeated to produce another unfinished color picture 140. In the following step, a pixel at an arbitrary position $(x_5, y_5)$ in the area 106 of the color picture 140 is selected. Three color density values of this pixel are used as reference three color density values and the processes of the first embodiment are repeated to extract the total characteristic area 121. A color picture 150 illustrates the extracted characteristic area 121.

In the third embodiment of this invention, the original density picture is produced as described in the first embodiment, and in parallel with the original density picture, a filtered color picture is obtained by filtering the color picture through low pass filter means. In a filtered color picture, each intensity component of R, G, B components of a pixel in an original color picture is substituted by an average of the corresponding intensity components of neighboring pixels situated in a predetermined range from the object pixel. In a background area, the change of the color of a pixel in neighboring pixels is slow if there is any change, and the color picture receives little change by low pass filter means in a background area. Only sharp changes at the boundaries from a background area to a characteristic area and in a characteristic figure are substantially smoothed by low pass filter means. In the third embodiment, the filtered color picture is assumed to represent the color picture of the background areas. A filtered density picture is obtained from the filtered color picture. The characteristic figure is obtained by subtracting the filtered density picture from the original density picture. As any component of the three color density values obtained by this subtraction must be larger than 0 (zero), the process B mentioned earlier is carried out on the filtered density picture for obtaining the processed density picture with a reference to the original density picture. Now the process B is explained. Three color density values of a pixel in the original density picture are represented by $$\begin{bmatrix} D_R \\ D_G \\ D_B \end{bmatrix}$$

and three color density values of the same pixel in the filtered density picture are represented by $$\begin{bmatrix} D_R \\ D_G \\ D_B \end{bmatrix}.$$

Then the subtraction of equation (3) yields:

$$\begin{bmatrix} D_{r2'} \\ D_{g2'} \\ D_{b2'} \end{bmatrix} = \begin{bmatrix} D_R \\ D_G \\ D_B \end{bmatrix} - a \begin{bmatrix} D_{r20} \\ D_{g20} \\ D_{b20} \end{bmatrix} \qquad (3)$$

Under a restriction where $D_{r2'} \geq 0$, $D_{g2'} \geq 0$, $D_{b2'} \geq 0$, the maximum value of a ($a_{max}$) for each pixel is determined. A common coefficient $k_2$ ($0<k_2\leq 1$) ($k_2$ in process B has a meaning similar to $k_1$ in process A) is multiplied with each $a_{max}$ to provide a product ($k_2$) ($a_{max}$) for each pixel. These products are then multiplied with respective three color density values $$\begin{bmatrix} D_{R2} \\ D_{G2} \\ D_{B2} \end{bmatrix}$$

of each pixel for producing the processed density picture.

The characteristic figure is obtained by subtracting the processed density picture from the original density picture.

In an alternative of the third embodiment, the original density picture is filtered by low pass filter means for producing a filtered density picture.

Figure 1:
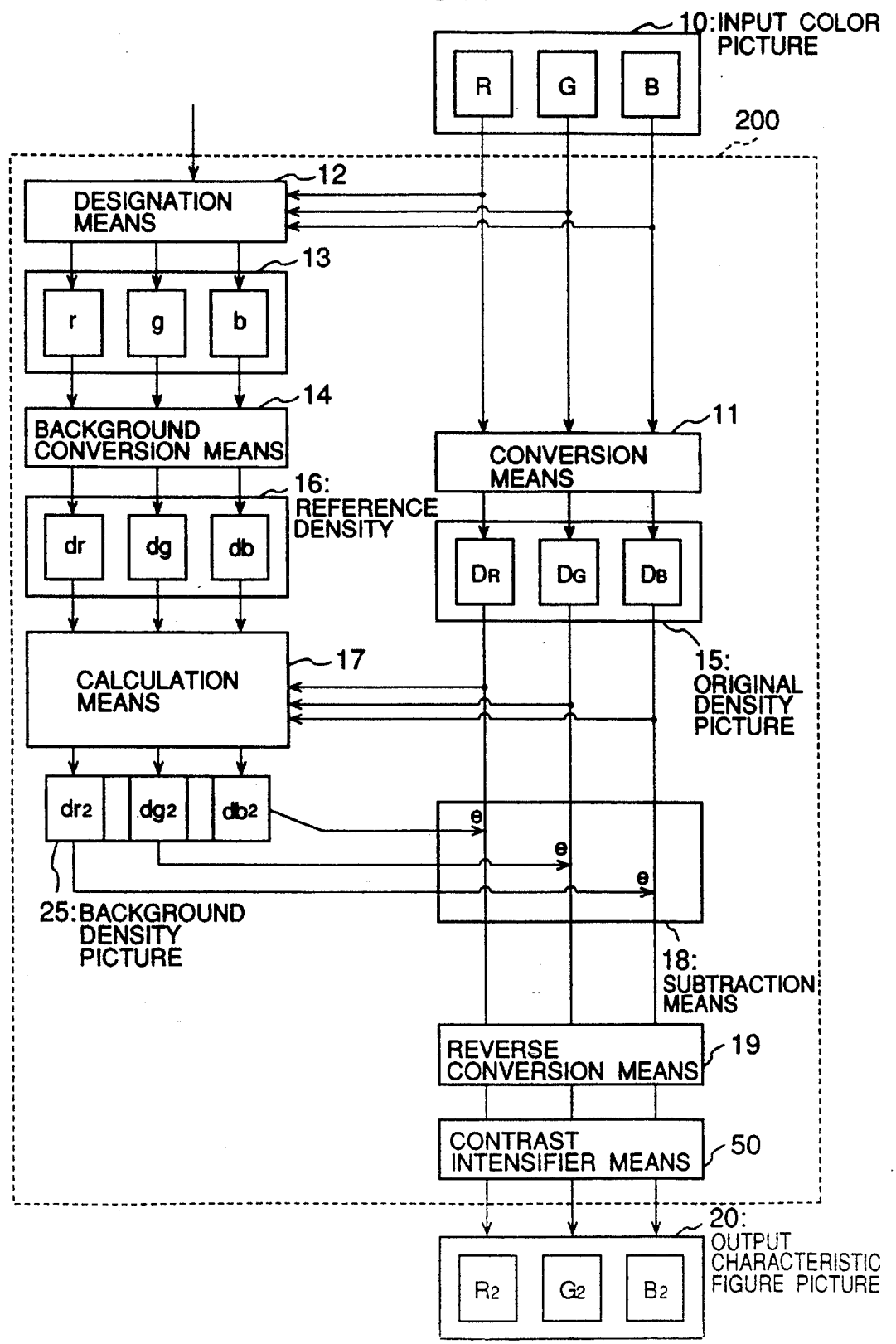
FIG. 1 illustrates a block diagram of an embodiment of this invention.

The fourth embodiment of this invention is described in connection with FIG. 1. In FIG. 1, a color picture 10 is represented by the intensities of the three color components, R, G, B of each pixel. The color picture 10 may be obtained from an output of a video camera and converted to a digital signal, or may be read out from an image memory of the color picture. The color picture 10 is converted to an original density picture 15 by conversion means 11 for producing original density picture 15. In the original density picture 15, each pixel is represented by the three density components $$\begin{bmatrix} D_R \\ D_G \\ D_b \end{bmatrix}.$$

Designation means 12 designates a pixel located in a background area. The color intensities of the designated pixel which is denoted by $$\begin{bmatrix} r \\ g \\ b \end{bmatrix}$$

13 is converted to the reference density $$\begin{bmatrix} d_r \\ d_g \\ d_b \end{bmatrix}$$

16 by background conversion means 14, and this density is determined as a reference density.

For an example of the designation means 12, a cathode ray tube display can be used in which a pixel is designated by a cursor on the display. When the original density picture 15 is stored in an image memory, the reference density 16 may be directly designated from the image memory bypassing the background conversion means 14.

Calculation means 17 for producing the background density picture produces the background density picture 25 by processing the original density picture 15 by process A with the reference density 16. Subtracting the background density picture 25 from the original density picture 15 by subtraction means 18, a density picture of the characteristic figure is obtained. The density picture of the characteristic figure is reverse converted to an output characteristic figure picture 20 by reverse conversion means 19.

Contrast intensifier means 50 will be described in a later paragraph.

The input color picture 10, the color intensities of the designated pixel 13, the original density picture 15, the reference density 16, the output characteristic figure picture 20, the background density picture 25 are usually stored in respective buffer memories, and these buffer memories are denoted by the same numerals which indicate the contents of these memories.

Thus, conversion means 11, designation means 12, background conversion means 14, calculation means 17, subtraction means 18, reverse conversion means 19, contrast intensifier means 50, and memories 13, 15, 16, 25 constitute an extraction means 200 for extracting an output characteristic figure picture 20 from an input color picture 10.

Figure 2:
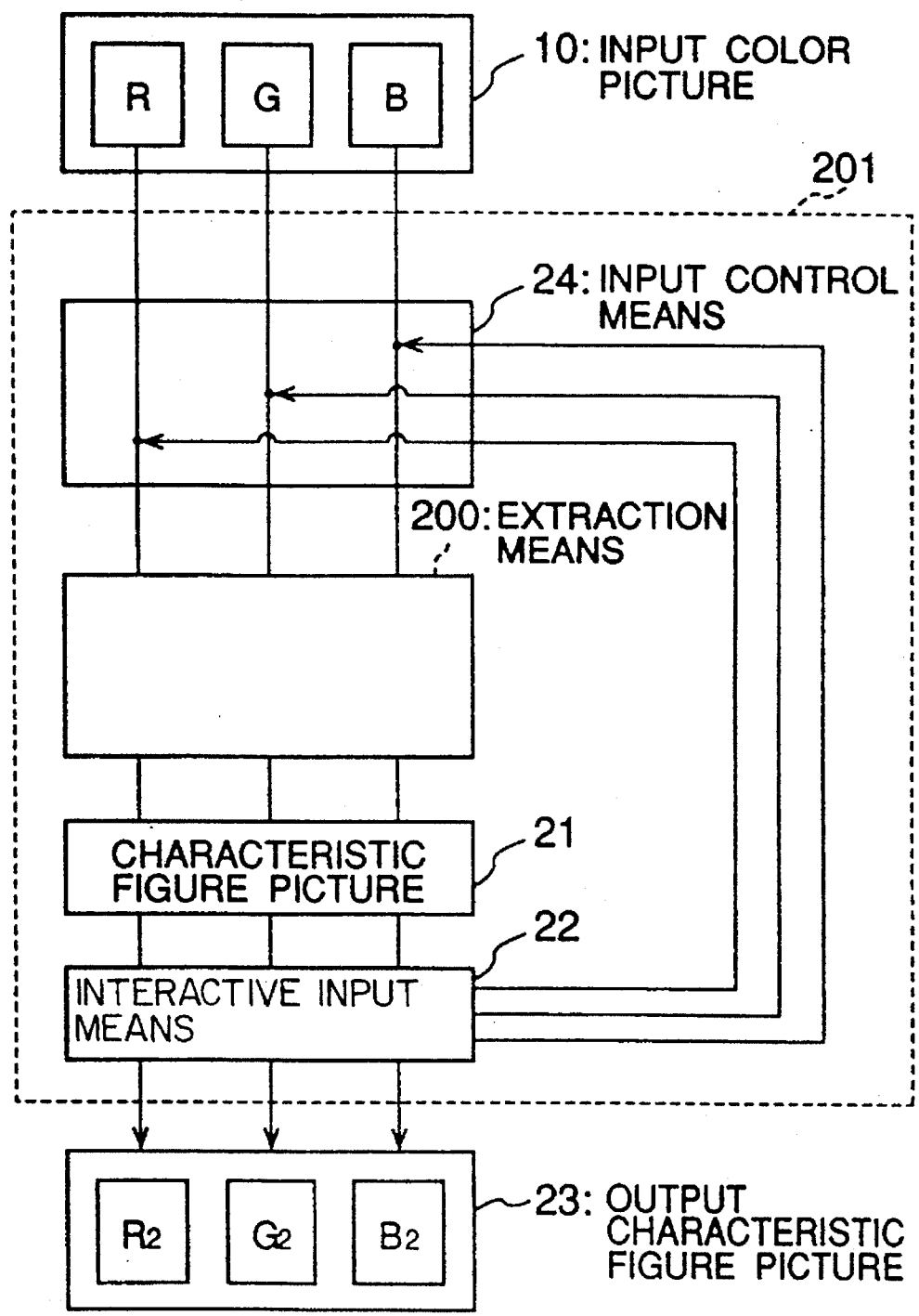
FIG. 2 illustrates a block diagram of another embodiment of this invention.

In the fifth embodiment of this invention which is shown in FIG. 2, interactive input means 22 for inputting a repetition determination and input control means 24 are further provided.

As described in connection with FIG. 1, a characteristic figure picture 21 is obtained from the input color picture 10. When a color picture 10 is as shown by 100 of FIG. 5, the characteristic figure picture 21 will be any one of the three color pictures 130, 140 and 150. Observing the characteristic figure picture 21 on a display, an operator decides whether the process is to be repeated or not, and a corresponding command is input via a keyboard. When the process is to be repeated, the input picture is changed by input control means 24 in accordance with the input command. When the color picture 150 in FIG. 5 is obtained, the operator judges that the output characteristic figure picture 23 is obtained.

Interactive input means 22 for deciding the repetition comprises, for example, an interactive input device composed of a display and a keyboard.

Figure 3:
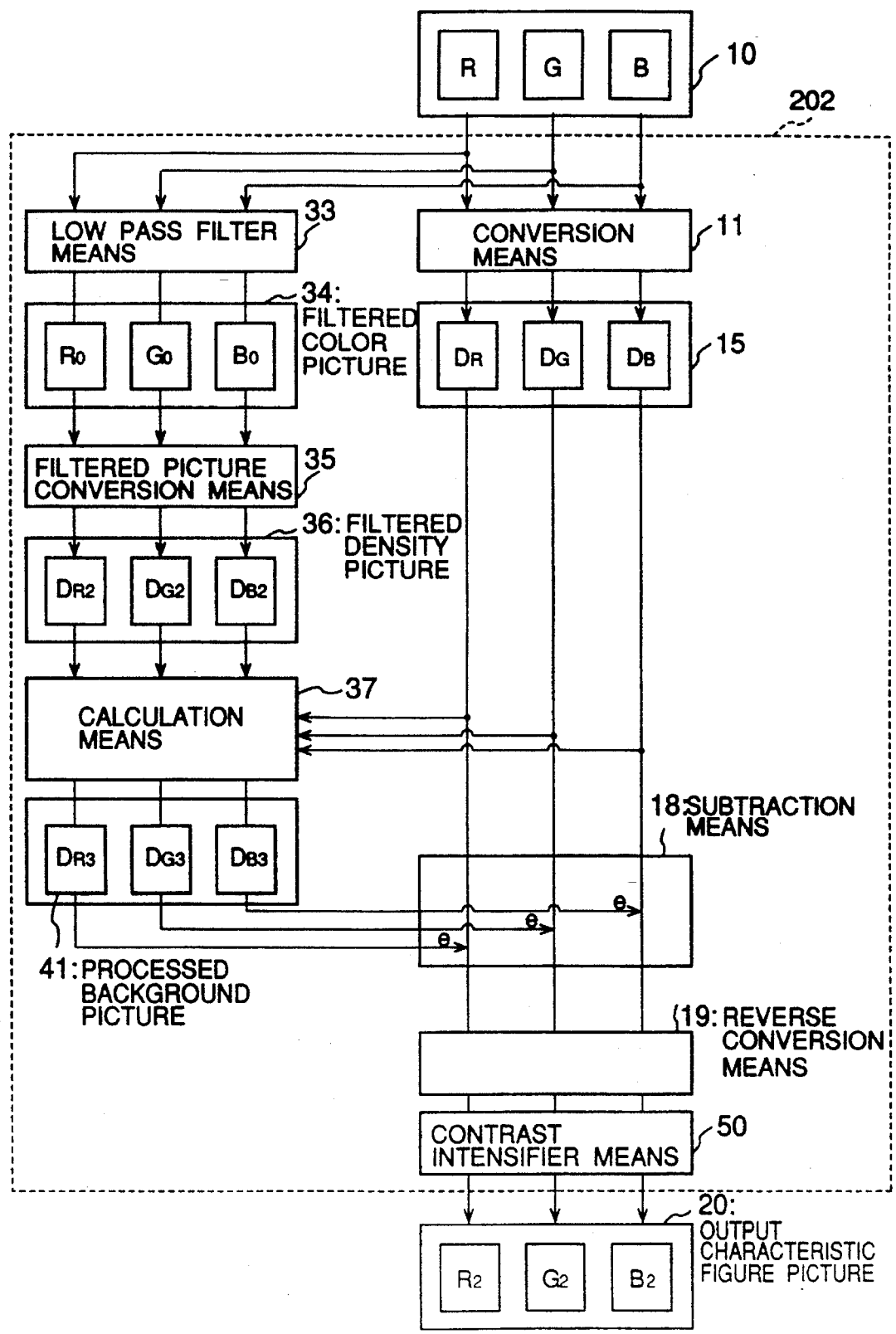
FIG. 3 illustrates a block diagram of a still another embodiment of this invention.

In the sixth embodiment of this invention as illustrated in FIG. 3, the color picture 10 is filtered by low pass filter means 33 for producing a filtered color picture 34. The filtered color picture 34 is converted to a filtered density picture 36 by filtered picture conversion means 35 for producing a filtered density picture. The filtered density picture 36 is processed by process B with reference to the original density picture 15 through calculation means 37 for producing a processed density picture. The processed density picture 41 which is obtained from calculation means 37, is subtracted from the original density picture 15 by subtraction means 18, and the resultant density picture is converted to a corresponding color picture by a reverse conversion means 19. The output of the reverse conversion means 19 is displayed as the output characteristic figure picture 20.

The contrast intensifier means 50 will be explained in a later paragraph.

As an alternative of the embodiment illustrated in FIG. 3, the filtered density picture 36 is produced by filtering the original density picture 15 through low pass filter means 33.

Color intensity values of a pixel have three different values as indicated by R, G, B and density values of a pixel have three different values as indicated by $D_r$, $D_g$, $D_b$, and these three different values are separately filtered by low pass filter means 33.

Either a set of digital filters or a set of analog filters may be used as the low pass filter means 33. When a set of analog filters is used, a digital-to-analog converter is inserted to an input of each filter, and an analog-to-digital converter is connected to the output of each filter.

When a color intensity value or a color density value is represented as a function of the pixel position as in a buffer memory 10 or 15, the position function must be converted to a time function through a conventional process before the function is filtered by low pass filter means.

The output of the reverse conversion means 19 in FIG. 1 and FIG. 3 may be displayed as the output characteristic figure picture. But, in a conventional practice, the contrast in the output characteristic figure picture is intensified by contrast intensifier means 50.

As for the contrast intensifier means 50, any conventional contrast intensifier means can be used. As a simple example, three color intensity values $R_i$, $G_i$, $B_i$ at the input of the contrast intensifier means 50 are converted to three color intensity values $R_p$, $G_p$, $B_p$ at the output in accordance with linear equations, $R_p = aR_i + b$, $G_p = aG_i + b$, and $B_p = aB_i + b$. For adequate values of the coefficients a and b, dynamic ranges of $R_p$, $G_p$, $B_p$ are expanded. As an example of the contrast intensification, the R, G, B intensities of a pixel are converted in lightness, saturation, and hue, and the histogram of the lightness is filtered to give a smooth change in the histogram. Or the histogram of the lightness is linearly transformed to give a wider threshold range.

Although only preferred embodiments have been described for this invention, it must be understood that various modifications can be made without departing from the scope of this invention.

I claim:

1. A method of extracting a characteristic figure from a color picture, wherein the color picture is composed of the characteristic figure superimposed on a background area, said method comprising:

(a) a step of scanning the color picture and electrically storing the scanned color picture as an array of pixels such that each pixel is represented by three color intensity values $$\begin{bmatrix} R \\ G \\ B \end{bmatrix},$$

where $0 \leq R, G, B \leq 1$;

(b) a step of converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r = -\log R$, $D_g = -\log G$, $D_b = -\log B$, thereby producing an original density picture;

(c) a step of designating a pixel in the background area of the color picture and determining a reference density from the three color density values $$\begin{bmatrix} D_{r0} \\ D_{g0} \\ D_{b0} \end{bmatrix}$$

ascertained for the designated pixel in said converting step;

(d) a step of determining, for each pixel, a maximum value $a_{max}$ of a coefficient 'a' in an equation $$\begin{bmatrix} D_{r'} \\ D_{g'} \\ D_{b'} \end{bmatrix} = \begin{bmatrix} D_r \\ D_g \\ D_b \end{bmatrix} - a \begin{bmatrix} D_{r0} \\ D_{g0} \\ D_{b0} \end{bmatrix},$$

under a restriction where $D_{r'} \geq 0$, $D_{g'} \geq 0$, and $D_{b'} \geq 0$;

(e) a step of selecting a value for a background elimination coefficient $k_1$ in a range of $0 < k_1 < 1$;

(f) a step of multiplying, for each respective pixel, $k_1 \cdot a_{max}$ with the reference density ascertained in said converting step for said respective pixel, thereby composing a background density picture composed of modified three color density values for each pixel;

(g) a step of subtracting the modified three color density values of each pixel in the background density picture from the three color density values of a corresponding pixel in the original density picture, thereby producing a characteristic density picture composed of resultant three color density values $$\begin{bmatrix} D_{r2} \\ D_{g2} \\ D_{b2} \end{bmatrix}$$

of each pixel;

(h) a step of reverse-converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2 = 10 \, \text{Exp} \, (-D_{r2})$, $G_2 = 10 \, \text{Exp} \, (-D_{g2})$, $B_2 = 10 \, \text{Exp} \, (-D_{b2})$; and (i) a step of displaying an image represented by the three color intensity values $$\begin{bmatrix} R_2 \\ G_2 \\ B_2 \end{bmatrix}$$

of each pixel.

2. The method of extracting a characteristic figure according to claim 1, wherein:

the background area has plural regions of different respective colors, after said step (g) is performed, said steps (c) to (g) are repeated for each of the plural regions, such that each iteration of said steps (c) to (g) corresponds to one of the plural regions, and for each of the iterations following an initial iteration, the characteristic density picture of a previous iteration is used as the original density picture.

3. A method of extracting a characteristic figure from a color picture, wherein the color picture is composed of the characteristic figure superimposed on a background area, said method comprising:

(a) a step of scanning the color picture and electrically storing the scanned color picture as an array of pixels such that each pixel is represented by three color intensity values $$\begin{bmatrix} R \\ G \\ B \end{bmatrix},$$

where $0 \leq R, G, B \leq 1$;

(b) a step of converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r = -\log R$, $D_g = -\log G$, $D_b = -\log B$, thereby producing an original density picture;

(c) a step of producing a filtered density picture, composed of filtered three color intensity values $$\begin{bmatrix} D_{R2} \\ D_{G2} \\ D_{B2} \end{bmatrix}$$

of each pixel, by (i) sequentially designating each pixel as an object pixel in the original density picture, and, for each object pixel, (ii) calculating an average value of corresponding components of three color density values of neighboring pixels situated in a predetermined range extending from the object pixel, and substituting, for each component of the three color density values of tile object pixel in the original density picture, the calculated average value of the corresponding components;

(d) a step of determining, for each pixel, a maximum value $a_{max}$ of a coefficient 'a' in an equation $$\begin{bmatrix} D_{r2'} \\ D_{g2'} \\ D_{b2'} \end{bmatrix} = \begin{bmatrix} D_r \\ D_g \\ D_b \end{bmatrix} - a \begin{bmatrix} D_{R2} \\ D_{G2} \\ D_{B2} \end{bmatrix},$$

under a restriction where $D_{r2'} \geq 0$, $D_{g2'} \geq 0$, and $D_{b2'} \geq 0$, and where $$\begin{bmatrix} D_{R2} \\ D_{G2} \\ D_{B2} \end{bmatrix}$$

are the filtered three color density values of a corresponding pixel in the filtered density picture;

(e) a step of selecting a value for a background elimination coefficient $k_1$ in a range of $0 < k_1 \leq 1$;

(f) a step of multiplying, for each respective pixel, $k_1 \cdot a_{max}$ with the three color density values of each said respective pixel in the filtered density picture, thereby composing a processed density picture composed of processed three color density values for each pixel; and (g) a step of subtracting the processed three color density values of each pixel in the processed density picture from the three color density values of a corresponding pixel in the original density picture, thereby producing a characteristic density picture composed of resultant three color density values $$\begin{bmatrix} D_{r2} \\ D_{g2} \\ D_{b2} \end{bmatrix}$$

of each pixel;

(h) a step of reverse-converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2 = 10 \operatorname{Exp}(-D_{r2})$, $G_2 = 10 \operatorname{Exp}(-D_{g2})$, $B_2 = 10 \operatorname{Exp}(-D_{b2})$; and (i) a step of displaying an image represented by the three color intensity values $$\begin{bmatrix} R_2 \\ G_2 \\ B_2 \end{bmatrix}$$

of each pixel.

4. An apparatus for extracting a characteristic figure from a color picture, wherein the color picture is composed of the characteristic figure superimposed on a background area, said apparatus comprising:

an image input device that stores the color picture electrically as an array of pixels such that each pixel is represented by three color intensity values $$\begin{bmatrix} R \\ G \\ B \end{bmatrix},$$

where $0 \leq R, G, B \leq 1$;

conversion means for converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r=-\log R$, $D_g=-\log G$, $D_b=-\log B$, thereby producing an original density picture;

designation means for designating a pixel in the background area of the color picture and determining a reference density from the three color density values $$\begin{bmatrix} D_{r0} \\ D_{g0} \\ D_{b0} \end{bmatrix}$$

ascertained for the designated pixel in said converting step;

calculation means for producing a background density picture from said original density picture, comprising:
(a) means for determining, for each pixel, a maximum value $a_{max}$ of a coefficient 'a' in an equation $$\begin{bmatrix} D_{r'} \\ D_{g'} \\ D_{b'} \end{bmatrix} = \begin{bmatrix} D_r \\ D_g \\ D_b \end{bmatrix} - a \begin{bmatrix} D_{r0} \\ D_{g0} \\ D_{b0} \end{bmatrix},$$

under a restriction where $D_{r'} \geq 0$, $D_{g'} \geq 0$, and $D_{b'} \geq 0$, and
(b) means for multiplying, for each respective pixel, $k_1 \cdot a_{max}$ with the reference density ascertained by said conversion means for said respective pixel, thereby composing the background density picture of modified three color density values for each pixel, where $k_1$ is a background elimination coefficient determined by design in a range $0 < k_1 \leq 1$;

subtraction means for producing a characteristic density picture composed of resultant three color density values $$\begin{bmatrix} D_{r2} \\ D_{g2} \\ D_{b2} \end{bmatrix}$$

of each pixel by subtracting the modified three color density values of each pixel in the background density picture from the three color density values of a corresponding pixel in the original density picture;

reverse-converting means for converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2=10 \text{ Exp}(-D_{r2})$, $G_2=10 \text{ Exp}(-D_{g2})$, $B_2=10 \text{ Exp}(-D_{b2})$; and an image output device for displaying an image represented by the three color intensity values $$\begin{bmatrix} R_2 \\ G_2 \\ B_2 \end{bmatrix}$$

of each pixel.

5. An apparatus used for extracting a characteristic figure according to claim 4, further comprising:
a contrast intensifier means for converting the three color intensity values of each pixel output by said reverse conversion means into contrast-enhanced three color intensity values.

6. An apparatus used for extracting a characteristic figure according to claim 4, wherein said image output device comprises a CRT display.

7. An apparatus used for extracting a characteristic figure according to claim 4, wherein said image output device comprises a three color printer.

8. An apparatus for extracting a characteristic figure from a color picture, wherein the color picture is composed of the characteristic figure superimposed on a background area, said apparatus comprising:

an image input device that stores the color picture electrically as an array of pixels such that each pixel is represented by three color intensity values $$\begin{bmatrix} R \\ G \\ B \end{bmatrix},$$

where $0 \leq R, G, B \leq 1$;

conversion means for converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r=-\log R$, $D_g=-\log G$, $D_b=-\log B$, thereby producing an original density picture;

low pass filter means for producing a filtered density picture composed of filtered three color density values $$\begin{bmatrix} D_{R2} \\ D_{G2} \\ D_{B2} \end{bmatrix}$$

of each pixel, by (i) sequentially designating each pixel as an object pixel in the original density picture, and, for each object pixel, (ii) calculating an average value of corresponding components of three color density values of neighboring pixels situated in a predetermined range extending from the object pixel, and substituting, for each component of the three color density values of the object pixel in the original density picture, the calculated average value corresponding components;

calculation means for producing a processed density picture from said filtered density picture, comprising:

(a) means for determining, for each pixel, a maximum value $a_{max}$ of a coefficient 'a' in an equation $$\begin{bmatrix} D_{r2'} \\ D_{g2'} \\ D_{b2'} \end{bmatrix} = \begin{bmatrix} D_r \\ D_g \\ D_b \end{bmatrix} - a \begin{bmatrix} D_{R2} \\ D_{G2} \\ D_{B2} \end{bmatrix},$$

under a restriction where $D_{r2'} \geq 0$, $D_{g2'} \geq 0$, and $D_{b2'} \geq 0$, and where $$\begin{bmatrix} D_{R2} \\ D_{G2} \\ D_{B2} \end{bmatrix}$$

are the filtered three color density values of a corresponding pixel in the filtered density picture, and (b) means for multiplying, for each respective pixel, $k_1 \cdot a_{max}$ with the three color density values of each said respective pixel in the filtered density picture, thereby composing the processed density picture of processed three color density values for each pixel, where $k_1$ is a background elimination coefficient determined by design in a range $0 < k_1 \leq 1$;

subtraction means for producing a characteristic density picture composed of resultant three color density values $$\begin{bmatrix} D_{r2} \\ D_{g2} \\ D_{b2} \end{bmatrix}$$

of each pixel by subtracting the processed three color density values of each pixel in the processed density picture from the three color density values of a corresponding pixel in the original density picture;

reverse-converting means for converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2 = 10 \text{ Exp}(-D_{r2})$, $G_2 = 10 \text{ Exp}(-D_{g2})$, $B_2 = 10 \text{ Exp}(-D_{b2})$; and an image output device for displaying an image represented by the three color intensity values $$\begin{bmatrix} R_2 \\ G_2 \\ B_2 \end{bmatrix}$$

of each pixel.

9. An apparatus used for extracting a characteristic figure according to claim 8, further comprising:

a contrast intensifier means for converting the three color intensity values of each pixel output by said reverse conversion means into contrast-enhanced three color intensity values.

10. An apparatus for extracting a characteristic figure from a color picture, wherein the color picture is composed of the characteristic figure superimposed on a background area, said apparatus comprising:

an image input device that stores the color picture electrically as an array of pixels such that each pixel is represented by three color intensity values $$\begin{bmatrix} R \\ G \\ B \end{bmatrix},$$

where $0 \leq R, G, B \leq 1$;

first conversion means for converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r = -\log R$, $D_g = -\log G$, $D_b = -\log B$, thereby producing an original density picture;

low pass filter means for producing a filtered color picture composed of filtered three color intensity values $$\begin{bmatrix} R_0 \\ G_0 \\ B_0 \end{bmatrix}$$

of each pixel, by (i) sequentially designating each pixel as an object pixel in the original color picture, and, for each object pixel, (ii) calculating an average value of corresponding components of three color intensity values of neighboring pixels situated in a predetermined range extending from the object pixel, and substituting, for each component of the three color intensity values of the object pixel in the original color picture, the calculated average value of the corresponding components;

second conversion means for converting the calculated average value of the corresponding components of each pixel to corresponding filtered three color density values $$\begin{bmatrix} D_{R2} \\ D_{G2} \\ D_{B2} \end{bmatrix},$$

utilizing equations $D_{R2} = -\log R_0$, $D_{G2} = -\log G_0$, $D_{B2} = -\log B_0$, thereby producing a filtered density picture from said filtered color picture;

calculation means for producing a processed density picture from said filtered density picture, comprising:

(a) means for determining, for each pixel, a maximum value $a_{max}$ of a variable 'a' in an equation $$\begin{bmatrix} D_{r2'} \\ D_{g2'} \\ D_{b2'} \end{bmatrix} = \begin{bmatrix} D_r \\ D_g \\ D_b \end{bmatrix} - a \begin{bmatrix} D_{R2} \\ D_{G2} \\ D_{B2} \end{bmatrix},$$

where $$\begin{bmatrix} D_{R2} \\ D_{G2} \\ D_{B2} \end{bmatrix}$$

are the filtered three color density values of a corresponding pixel in the filtered density picture, under a restriction where $D_{r2'} \geq 0$, $D_{g2'} \geq 0$, and $D_{b2'} \geq 0$, and (b) means for multiplying, for each respective pixel, $k_1 \cdot a_{max}$ with the three color density values of each said respective pixel in the filtered density picture, thereby composing the processed density picture of processed three color density values for each pixel, where $k_1$ is a background elimination coefficient determined by design in a range $0 < k_1 \leq 1$;

subtraction means for producing a characteristic density picture composed of resultant three color density values $$\begin{bmatrix} D_{r2} \\ D_{g2} \\ D_{b2} \end{bmatrix}$$

of each pixel by subtracting the processed three color density values of each pixel in the processed density picture from the three color density values of a corresponding pixel in the original density picture;

reverse-converting means for converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2 = 10 \text{ Exp } (-D_{r2})$, $G_2 = 10 \text{ Exp } (-D_{g2})$, $B_2 = 10 \text{ Exp } (-D_{b2})$; and an image output device for displaying an image represented by the three color intensity values $$\begin{bmatrix} R_2 \\ G_2 \\ B_2 \end{bmatrix}$$

of each pixel.

11. An apparatus used for extracting a characteristic figure according to claim 10, further comprising:

a contrast intensifier means for converting the three color intensity values of each pixel output by said reverse conversion means into contrast-enhanced three color intensity values.

12. A method of extracting a characteristic figure from a color picture, wherein the color picture is composed of the characteristic figure superimposed on a background area, said method comprising:

(a) a step of scanning the color picture and electrically storing the scanned color picture as an array of pixels such that each pixel is represented by three color intensity values $$\begin{bmatrix} R \\ G \\ B \end{bmatrix},$$

where $0 \leq R, G, B \leq 1$;

(b) a step of converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r = -\log R$, $D_g = -\log G$, $D_b = -\log B$, thereby producing an original density picture;

(c) a step of designating a pixel in the background area of the color picture and determining a reference density from the three color density values $$\begin{bmatrix} D_{r0} \\ D_{g0} \\ D_{b0} \end{bmatrix}$$

ascertained for the designated pixel in said converting step;

(d) a step of determining, for each pixel, a maximum value $a_{max}$ of a coefficient 'a' in an equation $$\begin{bmatrix} D_{r'} \\ D_{g'} \\ D_{b'} \end{bmatrix} = \begin{bmatrix} D_r \\ D_g \\ D_b \end{bmatrix} - a \begin{bmatrix} D_{r0} \\ D_{g0} \\ D_{b0} \end{bmatrix},$$

under a restriction where $D_{r'} \geq 0$, $D_{g'} \geq 0$, and $D_{b'} \geq 0$;

(e) a step of multiplying, for each respective pixel, $a_{max}$ with the reference density ascertained in said converting step for said respective pixel, thereby composing a background density picture composed of modified three color density values for each pixel;

(f) a step of subtracting the modified three color density values of each pixel in the background density picture from the three color density values of a corresponding pixel in the original density picture, thereby producing a characteristic density picture composed of resultant three color density values $$\begin{bmatrix} D_{r2} \\ D_{g2} \\ D_{b2} \end{bmatrix}$$

of each pixel;

(g) a step of reverse-converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2=10 \; \text{Exp} \; (-D_{r2})$, $G_2=10 \; \text{Exp} \; (-D_{g2})$, $B_2=10 \; \text{Exp} \; (-D_{b2})$; and (h) a step of displaying an image represented by the three color intensity values $$\begin{bmatrix} R_2 \\ G_2 \\ B_2 \end{bmatrix}$$

of each pixel.

13. An apparatus for extracting a characteristic figure from a color picture, wherein the color picture is composed of the characteristic figure superimposed on a background area, said apparatus comprising:

an image input device that stores the color picture electrically as an array of pixels such that each pixel is represented by three color intensity values $$\begin{bmatrix} R \\ G \\ B \end{bmatrix},$$

where $0 \leq R, G, B \leq 1$;

conversion means for converting the three color intensity values $$\begin{bmatrix} R \\ G \\ B \end{bmatrix}$$

of each pixel to corresponding three color density values $$\begin{bmatrix} D_r \\ D_g \\ D_b \end{bmatrix},$$

utilizing equations $D_r=-\log R$, $D_g=-\log G$, $D_b=-\log B$, thereby producing an original density picture;

designation means for designating a pixel in the background area of the color picture and determining a reference density from the three color density values $$\begin{bmatrix} D_{r0} \\ D_{g0} \\ D_{b0} \end{bmatrix}$$

ascertained for the designated pixel in said converting step;

calculation means for producing a background density picture from said original density picture, comprising:

(a) means for determining, for each pixel, a maximum value $a_{max}$ of a coefficient 'a' in an equation $$\begin{bmatrix} D_{r'} \\ D_{g'} \\ D_{b'} \end{bmatrix} = \begin{bmatrix} D_r \\ D_g \\ D_b \end{bmatrix} - a \begin{bmatrix} D_{r0} \\ D_{g0} \\ D_{b0} \end{bmatrix},$$

under a restriction where $D_{r'} \geq 0$, $D_{g'} \geq 0$, and $D_{b'} \geq 0$, and (b) means for multiplying, for each respective pixel, $a_{max}$ with the reference density ascertained by said conversion means for said respective pixel, thereby composing the background density picture of modified three color density values for each pixel;

subtraction means for producing a characteristic density picture composed of resultant three color density values $$\begin{bmatrix} D_{r2} \\ D_{g2} \\ D_{b2} \end{bmatrix}$$

of each pixel by subtracting the modified three color density values of each pixel in the background density picture from the three color density values of a corresponding pixel in the original density picture;

reverse-converting means for converting the resultant three color density values $$\begin{bmatrix} D_{r2} \\ D_{g2} \\ D_{b2} \end{bmatrix}$$

of each pixel in the characteristic density picture to three color intensity values $$\begin{bmatrix} R_2 \\ G_2 \\ B_2 \end{bmatrix},$$

utilizing equations $R_2=10 \; \text{Exp} \; (-D_{r2})$, $G_2=10 \; \text{Exp} \; (-D_{g2})$, $B_2=10 \; \text{Exp} \; (-D_{b2})$; and an image output device for displaying an image represented by the three color intensity values $$\begin{bmatrix} R_2 \\ G_2 \\ B_2 \end{bmatrix}$$

of each pixel.

* * * * *

UNITED STATES PATENT AND TRADEMARK OFFICE
CERTIFICATE OF CORRECTION

PATENT NO. : 5,524,069
DATED : June 4, 1996
INVENTOR(S) : Akira Inoue

It is certified that error appears in the above-indentified patent and that said Letters Patent is hereby corrected as shown below:

Column 6, lines 55-60, delete "$\begin{bmatrix} D_R \\ D_G \\ D_B \end{bmatrix}$" and insert -- $\begin{bmatrix} D_{R2} \\ D_{G2} \\ D_{B2} \end{bmatrix}$ --.

Column 10, line 9, delete "< 1" and insert -- ≤ 1 --.

Signed and Sealed this

Twenty-second Day of October, 1996

Attest:

BRUCE LEHMAN

*Attesting Officer*  *Commissioner of Patents and Trademarks*